United States Patent [19]

Olinger et al.

[11] 4,218,097
[45] Aug. 19, 1980

[54] LOW PROFILE WHEEL BALANCE WEIGHT

[75] Inventors: Kenneth J. Olinger, Akron; Lester Boydelatour, North Canton, both of Ohio

[73] Assignee: Goodyear Aerospace Corporation, Akron, Ohio

[21] Appl. No.: 941,874

[22] Filed: Sep. 13, 1978

[51] Int. Cl.² .............................................. B60B 27/00
[52] U.S. Cl. ................. 301/5 B; 151/41.76; 403/21
[58] Field of Search .............. 301/5 B, 6 A, 41 W; 74/573; 16/1 R, 1 C, DIG. 8; 151/41.7, 41.76; 403/21

[56] References Cited

U.S. PATENT DOCUMENTS

| 165,465 | 7/1875 | Whitney | 16/1 |
| 1,667,344 | 4/1928 | Couture | 301/5 B |
| 1,889,577 | 11/1932 | Tibbetts | 301/5 B |
| 3,046,058 | 7/1962 | Hamer | 301/5 B |

FOREIGN PATENT DOCUMENTS

| 125989 | 11/1947 | Australia | 151/41.76 |
| 661221 | 11/1951 | United Kingdom | 151/41.76 |

Primary Examiner—H. Grant Skaggs
Attorney, Agent, or Firm—P. E. Milliken; E. W. Oldham; R. L. Weber

[57] ABSTRACT

A wheel balance weight adapted for use between the halves of an aircraft wheel. The invention includes a substantially rectangular lead weight having a center hole passing therethrough. A plate having a well therein is received by the weight, with the well being maintained by the center hole. A locknut is press-fit in the well and is adapted for receiving a bolt passing through the web of the wheel for securing the weight assembly thereto. The reception of the locknut within the well substantially reduces the height of the weight assembly.

11 Claims, 4 Drawing Figures

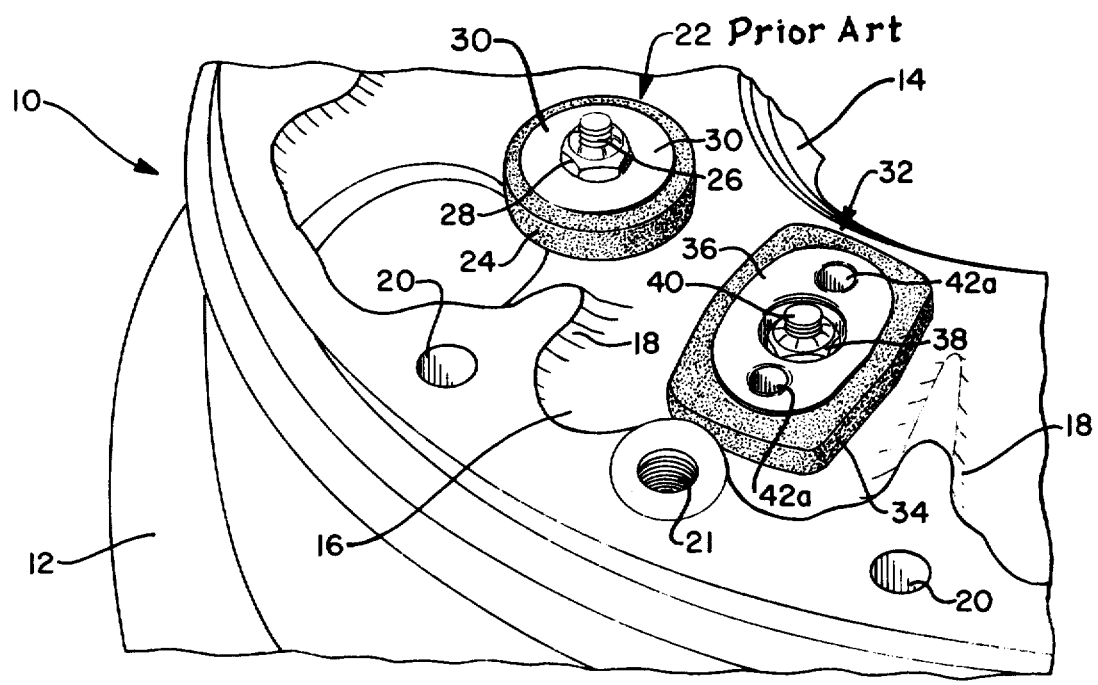
FIG. 1
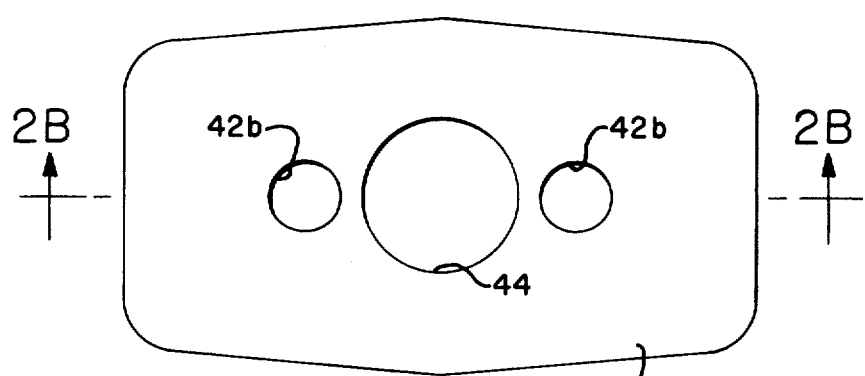
FIG 2A
FIG 2B
FIG. 2

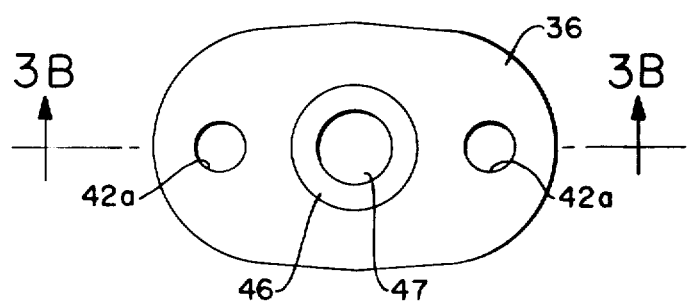
FIG 3A
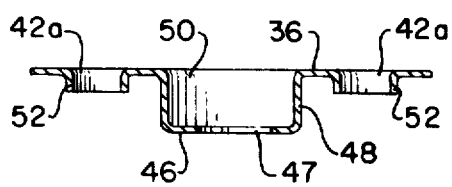
FIG 3B
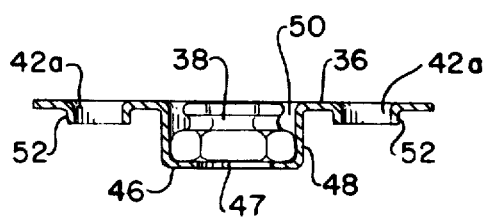
FIG 3C
FIG. 3
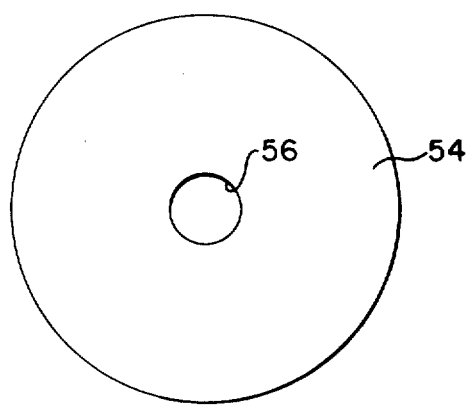
FIG. 4

LOW PROFILE WHEEL BALANCE WEIGHT

BACKGROUND OF THE INVENTION

The instant invention resides in the art of apparatus for balancing wheels. Particularly, the invention relates to an assembly which facilitates the balancing of aircraft wheels of the type formed in two halves.

In the past, aircraft wheels have been manufactured by securing together two wheel halves, and the same have been balanced individually by attaching weights to the wheel within the envelope defined by the joining of the two halves. However, new wheel designs have greatly limited the space available for the placement of such balancing weights. Indeed, wheels have been known to fail because the wheel halves have not been properly joined due to the binding of one half against a weight secured to the other half. Most likely, this occurs when a rib on one of the wheel halves makes contacting engagement with the bolt passing through the wheel web and securing the weight.

With the prior art wheel balancing apparatus and techniques, it has been necessary to drill holes within the webs of the wheel halves to attach weights thereto. Of course, each such hole weakens the wheel. Hence, it is most desirable to limit the number of weights to be attached to a wheel, and this can best be achieved by increasing the amount of weight which may be applied to a given available area on the web.

OBJECTS OF THE INVENTION

In light of the foregoing, it is an object of the instant invention to provide a low profile wheel balance weight which may be accommodated by the small envelopes between the wheel halves of modern aircraft wheels.

It is another object of the invention to provide a low profile wheel balance weight which, for a given height and area of the weight assembly, optimizes the weight which may be made available for balancing.

Yet a further object of the invention is to provide a low profile wheel balance weight which is adapted to include a washer of predetermined weight and thickness to allow for slight increases in the balance weight available, without substantially increasing the height of the total weight assembly.

Still another object of the invention is to provide a low profile wheel balance weight which includes means for holding the weight in a fixed relationship to the web of a wheel half during assembly.

Yet another object of the invention is to provide a low profile wheel balance weight which is simplistic and inexpensive to construct, reliable in operation, and easily adapted for implementation with state-of-the-art wheels.

SUMMARY OF THE INVENTION

The foregoing and other objects which will become apparent as the detailed description proceeds are achieved by a low profile wheel balance weight for connecting to a wheel, comprising: a weight having a first hole passing therethrough; a plate having a well pressed therein, said well being received within said first hole; and securing means received within said well for securing said weight to the wheel.

DESCRIPTION OF THE DRAWINGS

For a complete understanding of the objects and structure of the invention, reference should be had to the following detailed description and accompanying drawings wherein:

FIG. 1 is a pictorial view of a wheel-half utilizing a weight as taught by the prior art and one made in accordance with the teachings of the invention;

FIG. 2, comprising FIGS. 2A and 2B, presents a top plan view of the weight of the invention and a sectional view of such weight taken along the line 2B—2B;

FIG. 3, comprising FIGS. 3A-3C, presents a top plan view of the nut plate of the invention, a sectional view of the nut plate of the invention taken along the line 3B—3B, and the sectional view of FIG. 3B showing the nut plate receiving a locknut; and FIG. 4 is a top plan view of the circular disk weight or washer used to incrementally augment the weight supplied by the weight assembly.

DETAILED DESCRIPTION OF PREFERRED EMBODIMENT

Referring now to the drawings and more particularly FIG. 1, it can be seen that a section of a wheel half, as the same is known in the aircraft industry, is designated generally by the numeral 10. This wheel half includes a flange 12 against which a tire bead is formed in standard fashion. A hole 14 for maintaining the wheel upon an axle hub is also provided such that the wheel-half 10 is of a standard annular nature. A web 16 caps the inside portion of the wheel-half 10 and includes a plurality of ribs 18 positioned thereabout for purposes of strength and reinforcement. Holes 20 are provided for bolts securing the wheel-half to a second wheel-half to form the composite wheel, while the tapped hole 21 is adapted for receiving an inflation valve. Of course, the wheel halves may be of equal size or, alternatively, the other wheel half (not shown) may be merely a cap bearing a flange identical to the flange 12 for completing total securement of the tire upon the final wheel assembly.

The prior art has taught the utilization of a weight assembly such as that designated by the numeral 22. An annular lead disk 24 is secured to the web 16 by means of a bolt 26 and locknut 28. Of course, the bolt 26 passes through the center hole in the annular disk 24 and a corresponding hole drilled into the web 16. A washer 30 is interposed between the locknut 28 for force-bearing purposes and in standard fashion.

Utilizing the weight assembly 22 of the prior art, problems have been encountered with the height of the bolt protruding in the envelope defined between the two wheel halves. Indeed, above the annular lead disk 24, the assembly 22 extends the thickness of the washer 30, the height of the locknut 28, and at least two full turns of the bolt 26 to guarantee that secured engagement has been made. The only approach toward limiting the height of the assembly 22, while utilizing the known structure, is to limit the thickness of the annular disk 24. However, this also greatly limits the amount of weight available for application to the required area. However, the low profile wheel balance weight assembly 32 allows optimum weight to be placed at a required area while minimizing the height of the assembly itself. In the assembly 32, a weight 34, preferably of lead, receives the nut plate 36 thereon which has a recess for receiving a locknut 38. The locknut 38 makes securing engagement with the bolt 40 passing through a hole drilled in the web 16. Holes 42a are also provided in the nut plate 36 to facilitate assembly in a manner to be discussed hereinafter.

With reference to FIG. 2, it can be seen that the weight 34 is of a substantially rectangular nature, characterized by a broadened center section. Essentially, the weight 34 appears as back-to-back trapezoids, with the center tapering to the edges at an angle of approximately 5° from the major axis of the weight. This particular design accommodates the rib spacing in the aircraft wheel so that maximum weight may be placed in the available space. The weights 34 are characterized by a hole 44 drilled therethrough and preferably positioned at the center of the weight itself. Equally spaced on each side of the hole 44 are holes 42b, which align with the holes 42a in the nut plate 36 mentioned above. Of course, with the weights 34 being of lead, the holes 44,42b may be formed during the molding of the weight itself.

With continuing reference to FIG. 2, it will be appreciated that the weight 34 may be made in various sizes. It will also be appreciated that the total weight assembly 32 includes the elements 34–40 and, correspondingly, the weight provided by the weight assembly 32 is the aggregate weight of these elements. It is preferred that all of the weights 34, regardless of size, be formed to accommodate identical elements 36–40, with these latter elements having an aggregate weight of 0.4 ounces. For a weight assembly 32 to have a total weight of 4 ounces, the length of the weight 34 would be 2.222 inches; the major width would be 1.375 inches; the thickness would be 0.23 inches; the diameter of the hole 42b would be 0.25 inches; and the diameter of the hole 44 would be 0.594 inches. Correspondingly, in a weight assembly 32 providing 2 ounces of weight, the weight 34 would have a length of 1.593 inches; a major width of 1.062 inches; and identical measurements, as to thickness and hole diameters, as the 4 ounce weight just described. It will thus be appreciated that regardless of the weight provided by the assembly 32, that assembly has a fixed height.

Referring now to FIG. 3, a detailed appreciation of the nut plate 36 may be had. A well 50 is defined by a depending wall 48 pressed into the plate 36 and having an internal bottom flange 46 thereabout. The flange 46 defines a hole 47 passing centrally through the plate 36. The outside circumference of the depending wall 48 is slightly less than the diameter of the hole 44 provided within the weight 34. Similarly, holes 42a are pressed within the plate 36, having a depending rim 52 thereabout to be received within the holes 42b of the weight 34. Hence, the outside diameter of the rim 52 is slightly less than the diameter of the holes 42b. Hence, the plate 36 may be maintained upon the weight 34 with the rims 52 and depending wall 48 being respectively received by the holes 42b and 44 of the weight 34.

Prior to the receipt of the plate 36 by the weight 34, the locknut 38, having a major circumference slightly greater than the inner circumference of the well 50, is press-fit within the well. The edges of the locknut 38 make scoring and deforming engagement with the inside of the depending wall 48 of the well 50 to provide the desired secured engagement.

In use, a hole is drilled within the web 16 of the wheel-half 10 at the position deemed appropriate for balancing. A weight assembly, 32, of proper size, is then attached to the web by first inserting the nut plate 36 carrying the nut 38 into the receiving holes 42b,44 of the weight 34. The holes 42a of the plate 36 are of such size and are spaced apart in such manner as to receive a standard pin wrench to hold the weight assembly 32 while the bolt 40 is tightened into the nut 38. It will also be appreciated that the well 50 is of such depth that the bottom of the flange 46 rests upon or is in closed proximity to the surface of the web 16. By utilizing such structure, the dangers of over-torquing the bolt 40, as were ever present in the prior art, are substantially alleviated. This is due, in part, to the fact that there is minimal direct force upon the weight 34.

It will be appreciated from FIG. 1 that the assembly described above provides substantial weight concentration while greatly reducing the overall height of the weight assembly. Two full turns of the bolt 40 may still protrude beyond the locknut 38 without any substantial protrusion above the top surface of the nut plate 36. Unlike the prior art weight assembly 22, the locknut 38 is nearly coplanar with the top of the weight 34.

Due to the low profile nature of the assembly 32, it is possible to use incremental weights in association with the assembly 32. An annular disk 54, used for this purpose, is provided as shown in FIG. 4. The hole 56 is of a diameter corresponding to the hole 47 for receiving the bolt 40. The annular disks 54 may be provided in various weights, with the thickness of the disks 54 varying with the weight. It is preferred that the disks 54 be of a diameter of 1.5 inches such that the disk is substantially covered by the weight 34. For a one-half ounce weight, such a disk would have a thickness of 0.046 inches, while a one ounce weight would have a thickness of 0.092 inches. Thus, from the weights available via the elements of the assembly 32, modifications may be made by utilizing the one-half ounce and one ounce disks 54 just described. It will be appreciated that with the disks 54 being secured between the web 16 and weight 34, there is virtually no likelihood that the disk will break away from its secured engagement.

It has been found that the weight assemblies 32, used with or without the disks 54, provide very reliable means for balancing aircraft wheels without risking the contacting of the weight assembly with an opposing wheel half. While in accordance with the patent statutes only the best mode and preferred embodiment of the invention has been presented and described in detail, it is to be understood that the invention is not limited thereto or thereby. Consequently, for an appreciation of the true scope and breadth of the invention, reference should be had to the following claims.

What is claimed is:

1. A low profile wheel balance weight assembly for connecting to a wheel, comprising:
    a weight having first, second, and third holes passing therethrough;
    a plate having a well pressed therein, said well being recieved within said first hole and further having a pair of rims depending therefrom, said rims being received by said second and third holes; and
    securing means received within said well for securing said weight to the wheel.

2. The wheel balance weight assembly as recited in claim 1 wherein said weight has top and bottom surfaces, said plate resting upon said top surface and said well having a depth substantially equal to the thickness of said weight.

3. The wheel balance weight assembly as recited in claim 1 wherein said securing means comprises a nut securely engaged within said well.

4. The wheel balance weight assembly as recited in claim 3 wherein said nut is a locknut which is press-fit into said well.

5. The wheel balance weight assembly as recited in claim 1 which further includes an annular disk having a hole therethrough for alignment with said first hole in contacting engagement with said disk.

6. The wheel balance weight assembly as recited in claim 5 wherein said disk is provided for forceful contacting engagement between the wheel and said weight.

7. A wheel balance weight assembly for connection to the web of a wheel, comprising:
- a flat weight having a first hole passing therethrough;
- a plate mounted atop said weight and having a well therein, said well receiving a nut and being received within said first hole;
- a bolt passing through said weight from a side opposite said plate and being threadedly engaged with said nut; and
- wherein said weight includes second and third holes therein receiving rims depending from a bottom surface of said plate and defining holes in said plate in alignment with said second and third holes.

8. The wheel balance weight assembly according to claim 7 wherein said weight is substantially rectangular in shape, said first hole being centered on said weight and said second and third holes being equally spaced on each side thereof.

9. The wheel balance weight assembly according to claim 7 wherein said nut is press-fit into said well.

10. The wheel balance weight assembly according to claim 7 wherein a top surface of said nut is substantially coplanar with a top surface of said weight.

11. The wheel balance weight assembly according to claim 7 wherein the depth of said well is substantially equal to the thickness of said weight.

* * * * *